United States Patent [19]

Schiessle et al.

[11] Patent Number: 5,144,208
[45] Date of Patent: Sep. 1, 1992

[54] DEVICE FOR ADJUSTING A NOMINAL VALUE OF THE DIMENSION OF AN ACTUATOR, THE LONGITUDINAL DIMENSION OF WHICH CAN BE CHANGED BY APPLYING AN EXTERNAL ELECTROMAGNETIC OR ELECTROSTATIC FIELD

[75] Inventors: Edmund Schiessle, Schorndorf; Khaldoun Alasafi, Schwäbisch-Gmünd; Ralf Gutöhrlein, Fellbach-Schmiden, all of Fed. Rep. of Germany

[73] Assignee: Mercedes-Benz AG, Fed. Rep. of Germany

[21] Appl. No.: 661,012

[22] Filed: Feb. 26, 1991

[30] Foreign Application Priority Data

Mar. 17, 1990 [DE] Fed. Rep. of Germany ....... 4008643

[51] Int. Cl.$^5$ ............................................. H01L 41/08
[52] U.S. Cl. ..................................... 318/118; 310/26; 310/316
[58] Field of Search .................. 310/26, 316, 317, 312; 318/116, 118

[56] References Cited

U.S. PATENT DOCUMENTS

| | | | |
|---|---|---|---|
| 3,414,857 | 12/1968 | Barden | 336/233 |
| 3,763,411 | 10/1973 | Goof | 318/118 |
| 3,857,081 | 12/1974 | Gebelein, Jr. | 318/118 X |
| 3,995,451 | 12/1976 | Vinnemann | 310/332 X |
| 4,585,978 | 4/1986 | Hasselmark et al. | 318/118 |
| 4,975,643 | 12/1990 | Buchwald | 318/118 X |

FOREIGN PATENT DOCUMENTS 2402085 8/1974 Fed. Rep. of Germany .
2168481 6/1986 United Kingdom ................ 310/330

*Primary Examiner*—Mark O. Budd
*Attorney, Agent, or Firm*—Evenson, Wands, Edwards, Lenahan & McKeown

[57] ABSTRACT

A device for adjusting a nominal value of the dimension of an actuator, the longitudinal dimension of which can be changed by applying an external electromagnetic or electrostatic field, the magnitude of the external electromagnetic or electrostatic field being associated with the longitudinal dimension of the actuator, or soft-magnetic and highly magnetoelastic layer being connected to the actuator in such a manner that a change in length of the actuator produces a change in the mechanical stress in the layer. The change in mechanical stress in the layer produces a change in the value of an inductance, the mechanical stress in the layer being inferred from the magnitude of the inductance in sensor electronics and the longitudinal dimension of the actuator being inferred from the mechanical stress in the layer. The longitudinal dimension of the actuator is compared with a predetermined nominal value in a comparison device and a correcting variable is output by a control device when a difference between the longitudinal dimension of the actuator and the predetermined nominal value is detected by the comparison device. The correcting variable is predetermined in such a manner that the detected difference disappears.

9 Claims, 1 Drawing Sheet

DEVICE FOR ADJUSTING A NOMINAL VALUE OF THE DIMENSION OF AN ACTUATOR, THE LONGITUDINAL DIMENSION OF WHICH CAN BE CHANGED BY APPLYING AN EXTERNAL ELECTROMAGNETIC OR ELECTROSTATIC FIELD

BACKGROUND AND SUMMARY OF THE INVENTION

The present invention relates to a device for adjusting a nominal value of the dimension of an actuator, a longitudinal dimension of which is changeable by application of an external electromagnetic or electrostatic field, the magnitude of the external electromagnetic or electrostatic field being associated with the longitudinal dimension of the actuator. The device has means for generating a signal characterizing the longitudinal dimension of the actuator, a comparison device that compares the signal characterizing the longitudinal dimension with a predetermined nominal value to detect a deviation of the longitudinal dimension from the predetermined nominal value, and a control device that outputs a correcting variable when a difference between the longitudinal dimension of the actuator and the predetermined nominal value is detected by the comparison device, the correcting variable being predetermined in such a manner that the detected difference disappears.

In a device known from U.S. Pat. No. 4,585,978, the change in length resulting from an external magnetic field of a magnetostrictive actuator is determined by the magnetic induction resulting in the actuator. The change in length thus determined in the magnetostrictive actuator is compared with the nominal value of the change in length. On the basis of this comparison, the external magnetic field is changed in such a manner that a resultant difference between the change in length and the nominal value disappears.

A disadvantageous effect in this known device is that the comparison between the change in length and the nominal value can only be carried out with a magnetostrictive actuator.

A device is also known from German Patent Document DE 24 02 85 A1, in which a rod-shaped body is constructed of a number of stacked laminations or discs of piezoelectric material, and a particular change in length of the rod-shaped body is set by applying an electric voltage. Furthermore, it is stated in this German Patent Document that the relationship between the displacement and the voltage is linear so that a control of the change in length is implemented by adjusting the associated electric voltage.

A disadvantageous effect in this known device is that the laminations or discs of piezoelectric material can change their dimension in dependence on the operating conditions of the rod-shaped body. An "offset" occurs, that is to say the zero-point position of the longitudinal dimension of the laminations or discs changes in the sense that the longitudinal dimension of the rod-shaped body becomes smaller. Thus, problems occur in the control arrangement known from the prior art, to the extent that the accurate association of an electric voltage applied to the laminations with a particular dimension is lost.

It is also known from U.S. Pat. No. 3,414,857 to change the magnetic properties of a core located in the interior of a coil by means of the composition of the individual components and thus to bring the inductance of the coil to a defined value. By this means it is intended to compensate for production tolerances which occur, for example, due to inaccuracies in the winding of the coil.

An object of the present invention is to provide a device for adjusting a nominal value of the dimension of an actuator that adjusts as accurately as possible the nominal value of the longitudinal dimension of the actuator, the longitudinal dimension of which can be changed by applying an external electromagnetic or electrostatic field This and other objects are achieved by the present invention which provides a device for adjusting a nominal value of the dimension of an actuator, a longitudinal dimension of which is changeable by application of an external electromagnetic or electrostatic field, the magnitude of the external electromagnetic or electrostatic field being associated with the longitudinal dimension of the actuator. The device has means for generating a signal characterizing the longitudinal dimension of the actuator, a comparison device that compares the signal characterizing the longitudinal dimension with a predetermined nominal value to detect a deviation of the longitudinal dimension from the predetermined nominal value, and a control device that outputs a correcting variable when a difference between the longitudinal dimension of the actuator and the predetermined nominal value is detected by the comparison device, the correcting variable being predetermined in such a manner that the detected difference disappears. The device includes an actuator, a position sensor element, and a soft-magnetic and highly magnetoelastic layer, which is part of the position sensor and is connected to the actuator in such a manner that a change in length of the actuator produces a change in the mechanical stress in the layer. An inductance is part of the position sensor element, with a change in the mechanical stress in the layer producing a change in the value of the inductance. The device has means for generating a signal characterizing the change in the longitudinal dimension on the basis of the change in inductance, including means for inferring the mechanical stress in the layer from the magnitude of the inductance and means for inferring the longitudinal dimension of the actuator from the mechanical stress in the layer.

The present invention has advantages compared with the known prior art, both when a piezoelectric actuator and when a magnetostrictive actuator is used. For example, influencing variables, besides the "offset" already described, which lead to a displacement in the zero-point position of the longitudinal dimension of the piezoelectric actuator can also be eliminated by applying the device according to the present invention. As an example, temperature changes lead to a change in the longitudinal dimension of a piezoelectric actuator and of a magnetostrictive actuator. In addition, the device according to the present invention can be used both for magnetostrictive and for piezoelectric actuators.

According to an embodiment of the present invention, a magnetoelastic layer is applied to the actuator. If then a change occurs in the length of the actuator, this change in length produces a mechanical stress in the magnetoelastic layer. The mechanical stress in the magnetoelastic layer can be detected, for example, in that this magnetoelastic layer is part of a coil, the inductance of which thus changes due to the mechanical stress in the magnetoelastic layer.

Other objects, advantages and novel features of the present invention will become apparent from the following detailed description of the invention when considered in conjunction with the accompanying drawings.

DETAILED DESCRIPTION OF THE DRAWINGS

Figure 1:
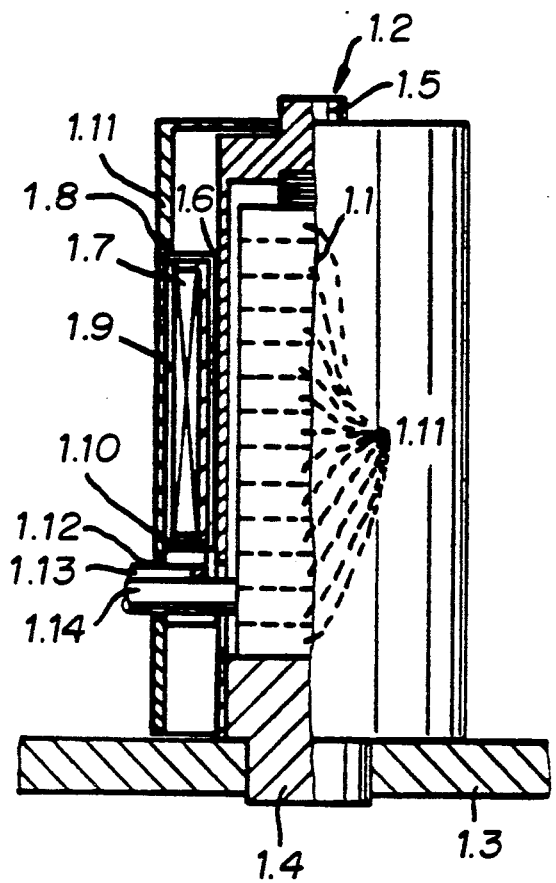
FIG. 1 shows an illustrative embodiment of a piezoelectric actuator comprising a magnetoelastic layer constructed in accordance with an embodiment of the present invention.
Figure 2:
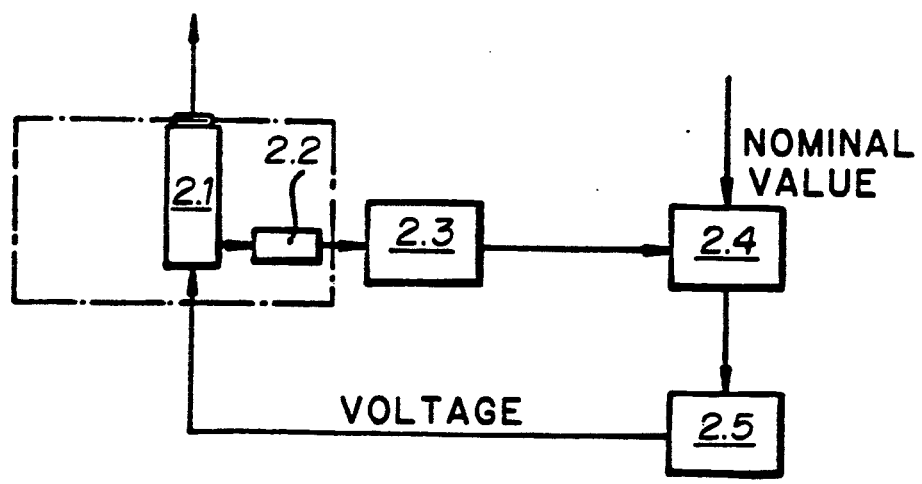
FIG. 2 shows a representation of the effect of a nominal-value input on the change in length of a piezoelectric actuator.

In the illustrative embodiments of FIGS. 1 and 2, a piezoelectric actuator 1.1 is used. Alternatively, however, it is also contemplated to use a magnetostrictive actuator instead of the piezoelectric actuator 1.1. In this case, the connecting cables 1.13 and 1.14 produce, for example, a current flow in a coil (not shown) which thus originate a magnetic field which leads to a change in length of the magnetostrictive actuator.

As can be seen from FIG. 1, a piezoelectric actuator 1.1 is surrounded by a position sensor element 1.2. In this arrangement, the piezoelectric actuator 1.1, according to the prior art, can consist of several piezoelectric discs 1.1.1 which can change their longitudinal dimension in the axial direction when an electric voltage is applied. During this process, the piezoelectric discs 1.1.1 are mechanically prestressed in that they are pressed against a nonmagnetic resilient sleeve 1.5, acting as a thrust bearing, by a threaded bolt 1.4 screwed into a base area 1.3.

The nonmagnetic resilient sleeve 1.5 is in force-locked contact with the base area 1.3. This force-locked contact is implemented by the nonmagnetic resilient sleeve 1.5 being provided on its underside with a thread into which the threaded bolt 1.4 is screwed.

A soft-magnetic and highly magnetoelastic layer 1.6 is applied to the nonmagnetic resilient sleeve 1.5, this soft-magnetic and highly magnetoelastic layer 1.6 being applied in a particularly advantageous manner in such a way that a molecular intermeshing exists between this layer 1.6 and the resilient sleeve 1.5. The soft-magnetic and highly magnetoelastic layer 1.6 in this arrangement can, for example, consist of an amorphous or nanocrystalline material of nickel-phosphorus which can be optimized by means of chemical transition elements, for example, cobalt. As an example, this material can consist of a composition of which the phosphorus content is less than approximately 8% and the cobalt content is of the order of magnitude of approximately 10%. The thickness of this layer 1.6 in this arrangement can be of the order of magnitude of approximately 100-150 $\mu$m. Since expansion of the soft-magnetic and highly magnetoelastic layer 1.6 within the per-thousand range already leads to a change of some percent in the magnetic permeability $\mu_r$, the actual longitudinal dimension of the piezoelectric actuator can thus be easily determined by means of the change in inductance of the coil 1.7.

According to the illustrative embodiment of FIG. 1, the magnetic flux is suitably concentrated by attaching soft-magnetic reflux pieces 1.8, 1.9 and 1.10 around the coil 1.7. In addition, the system comprising the piezoelectric actuator 1.1 and the position sensor element 1.2 can also be terminated by a non-magnetic housing sleeve 1.11. In this arrangement, this housing sleeve 1.11 is attached to the upper and the lower part of the position sensor element 1.2 and also encloses the coil 1.7. The housing sleeve 1.11 exhibits an opening 1.12 through which the connecting cables 1.13, 1.14 of the piezoelectric actuator are conducted.

FIG. 2 shows a representation of the effect of a nominal-value input SOLL on the change in length of the piezoelectric actuator which is designated by the reference symbol 2.1 in the representation of FIG. 2. The position sensor element 2.2 detects the dimension of the actuator 2.1 in that, for example, the inductance of a sensor coil changes in accordance with the representation of FIG. 1. This change in inductance is then evaluated by the sensor electronics 2.3 and compared in a comparison device 2.4 with the predetermined nominal value SOLL of the dimension of the actuator 2.1. If a difference is found, a correcting variable voltage is output by the control device 2.5 which counteracts this difference. When a magnetostrictive actuator is used, a magnetic field is correspondingly predetermined as correcting variable.

In principle, the behavior of a control system with time is determined by the behavior with time during the registering of the measurement value, the behavior with time of the controller and the behavior with time of the process after a change in a nominal value. In the device according to the present invention, the behavior with time during the registering of the measurement value can be neglected since the magnetoelastic layer responds virtually without time delay to changes in the mechanical stress. Similarly, the process (actuator) very rapidly responds to changes in the nominal value so that the behavior with time described overall of the control system can be implemented by this desired behavior with time being simulated in the control device 2.5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for adjusting a nominal value of the dimension of an actuator, a longitudinal dimension of which is changeable by application of an external electromagnetic or electrostatic field, the magnitude of the external electromagnetic or electrostatic field being associated with the longitudinal dimension of the actuator, comprising:

means for generating a signal characterizing the longitudinal dimension of the actuator;

a comparison device that compares the signal characterizing the longitudinal dimension with a predetermined nominal value to detect a deviation of the longitudinal dimension from the predetermined nominal value;

a control device that outputs a correcting variable when a difference between the longitudinal dimension of the actuator and the predetermined nominal value is detected by the comparison device, the correcting variable being predetermined in such a manner that the detected difference disappears;

an actuator;

a position sensor element;

a soft-magnetic and highly magnetoelastic layer, which is part of the position sensor and is connected to the actuator in such a manner that a change in length of the actuator produces a change in the mechanical stress in the layer;

an inductance which is part of the position sensor element, wherein the change in the mechanical stress in the layer produces a change in the value of the inductance; and means for generating a signal characterizing the change in the longitudinal dimension on the basis of the change in inductance, including means for inferring the mechanical stress in the layer from the magnitude of the inductance and means for inferring the longitudinal dimension of the actuator from the mechanical stress in the layer.

2. The device according to claim I, wherein the actuator is a piezoelectric actuator and the external field corresponds to an electric voltage.

3. The device according to claim 1, wherein the actuator is a magnetostrictive actuator and the external field is a magnetic field.

4. The device according to claim 3, wherein the layer consists of nickel, phosphorus and cobalt, the nickel content being up to 8%, and the cobalt content, being approximately 10%.

5. The device according to claim 4, further comprising a resilient sleeve coupled to the soft-magnetic and highly magnetoelastic layer such that a molecular intermeshing exists between the soft-magnetic and highly magnetoelastic layer and the resilient sleeve.

6. The device according to claim 2, wherein the layer consists of nickel, phosphorus and cobalt, the nickel content being up to 8%, and the cobalt content, being approximately 10%.

7. The device according to claim 6, further comprising a resilient sleeve coupled to the soft-magnetic and highly magnetoelastic layer such that a molecular intermeshing exists between the soft-magnetic and highly magnetoelastic layer and the resilient sleeve.

8. The device according to claim 1, wherein the layer consists of nickel, phosphorus and cobalt, the nickel content being up to 8%, and the cobalt content, being approximately 10%.

9. The device according to claim 8, further comprising a resilient sleeve coupled to the soft-magnetic and highly magnetoelastic layer such that a molecular intermeshing exists between the soft-magnetic and highly magnetoelastic layer and the resilient sleeve.

* * * * *